United States Patent
Stryzak et al.

(10) Patent No.: US 9,026,669 B2
(45) Date of Patent: May 5, 2015

(54) SYSTEM AND METHOD FOR MULTIPLE DATA CHANNEL TRANSFER USING A SINGLE DATA STREAM

(76) Inventors: Bohdan Stryzak, Bridgewater, NJ (US); Thomas E. Terwilliger, Pompano Beach, FL (US)

(*) Notice: Subject to any disclaimer, the term of this patent is extended or adjusted under 35 U.S.C. 154(b) by 195 days.

(21) Appl. No.: 13/313,375

(22) Filed: Dec. 7, 2011

(65) Prior Publication Data
US 2013/0145039 A1    Jun. 6, 2013

Related U.S. Application Data

(62) Division of application No. 12/460,209, filed on Jul. 15, 2009, now Pat. No. 8,166,190.

(60) Provisional application No. 61/134,920, filed on Jul. 15, 2008.

(51) Int. Cl.
| H04N 7/16 | (2011.01) |
| G06F 15/00 | (2006.01) |
| H04L 29/06 | (2006.01) |
| H04L 12/18 | (2006.01) |
| H04N 21/236 | (2011.01) |
| H04N 21/854 | (2011.01) |
| H04N 21/2665 | (2011.01) |
| H04N 21/81 | (2011.01) |
| H04N 21/845 | (2011.01) |

(52) U.S. Cl.
CPC ........ *H04L 65/4069* (2013.01); *H04L 12/1859* (2013.01); *H04N 21/236* (2013.01); *H04N 21/23614* (2013.01); *H04N 21/854* (2013.01); *H04L 65/605* (2013.01); *H04N 21/2665* (2013.01); *H04N 21/812* (2013.01); *H04N 21/8455* (2013.01); *H04L 65/4076* (2013.01)

(58) Field of Classification Search
USPC .................................. 709/231; 370/386, 389
See application file for complete search history.

(56) References Cited

U.S. PATENT DOCUMENTS

| 6,876,901 | B2* | 4/2005 | DiLorenzo | 700/231 |
| 7,016,337 | B1* | 3/2006 | Wu et al. | 370/352 |
| 2002/0080827 | A1* | 6/2002 | Lee | 370/527 |
| 2006/0288395 | A1* | 12/2006 | DiLorenzo | 725/113 |
| 2009/0070827 | A1* | 3/2009 | Barroso | 725/68 |

* cited by examiner

*Primary Examiner* — Lynn Feild
*Assistant Examiner* — Natisha Cox
(74) *Attorney, Agent, or Firm* — Daniel L. Dawes; Marcus C. Dawes (57) ABSTRACT

A number of channels of data, including audio, image, text, and support data are collected at one or more centralized servers. The individual channels are edited and processed for content and format, including the deletion and insertion of advertising content and markers to indicate locations for additional content. These channels are then sent to a plurality of transmission servers for processing one or more of the channels including the insertion of content at designated markers and the combination of the channels of data into a single, packetized data transfer stream. The transmission servers broadcast the data transfer stream to a plurality of receiving units which de-packetize the original data channels and present any selected channel to the user of the receiving unit. The receiving units send status information back to the centralized servers where the data is processed and analyzed to evaluate the present and future use of advertisements.

2 Claims, 6 Drawing Sheets

Raw Stream with Channel 0 and Channel 51 fixed number of bytes
Raw Stream Channel 1 to Channel 50 have a variable number of bytes

Fig. 5b

Each of the PES packets are fixed size, 184 bytes of data and 4 byte header

Fig. 6

```
                Header
bits 0 to 7     Sync Byte (0X47)
bit 8           Transport Error      error = '1'
bit 9           Start of payload     start = '1'
bit 10          Transport priority
bit 11 to 23    PID                  Contains Ludwig specific ID
bit 24 to 25    Scrambling Control
bit 26 to 27    Adaptive field       no field = '01'
bit 28 to 31    Continuity Counter
```

SYSTEM AND METHOD FOR MULTIPLE DATA CHANNEL TRANSFER USING A SINGLE DATA STREAM

CROSS-REFERENCE TO RELATED APPLICATIONS

This application is a divisional application of, and claiming priority from, U.S. Utility application Ser. No. 12/460,209 filed Jul. 15, 2009 now U.S. Pat. No. 8,166,190 which claims priority from U.S. Provisional application Ser. No. 61/134,920 having a filing date of Jul. 15, 2008.

BACKGROUND OF THE INVENTION

With the pervasiveness and exponential growth of the "connectedness" of the population it would be ideal if advertisement could take advantage of this connectedness and could be directed to the group of truly potential customers, even individuals, rather than using the broad approaches of the past—billboards, magazines, newspapers, etc. While television commercials can be more narrowly directed due to the growth of specialized TV channels, such focused advertisement is hard to achieve in other media.

There is a growing market for more and more targeted, specialized media. One such market is based upon the growing foreign born population in the US and the wide ethnic diversity within that population. For example, Latin Americans make up 52% of the US foreign born population and the Asian community makes up 26%. This diversity creates a large demand for ethnic directed media. To fulfill the demand for the many possible varieties of such specialized media would require huge amounts of bandwidth and a large number of frequency licenses within the limited and already crowded usable transmission spectra.

As all types of wireless communication and interaction are becoming more commonplace music, video, large amounts of data, and programs are now available to every cell phone user, satellite radio subscriber, mobile email user, and notebook computers roaming throughout 'wired' fast food restaurants, libraries, stores, office buildings, and even whole cities. The newly implemented HDTV, while more efficient than previous analog transmission, will be using more and more of the limited and valuable spectra. Constantly improving compression CODECs have increased the quality of content available over narrower bandwidth but there are still limitations on quality and a limited number of available transmission frequencies.

While, Wi-Fi, WiMax, 3G, 4G, Lite, etc. pathways can supply basic demand for all types of content, high quality real-time video and audio is still best served by over-the-air and satellite transmission. However it is now even more difficult to find space on the Broadcast Bands. With this overcrowding of the air waves, a desire to serve narrow, specialized markets would require lots of infrastructure and be monetarily prohibitive. Spectrum licenses and equipment for a single channel/station, let alone multiple channels, would be out of reach for a small niche market.

The invention of the present application is used to spread digital content to small niche markets by providing the method and means to supply multiple channels of data over existing pathways using limited bandwidth. The present invention can be used to increase advertising revenue for the suppliers of the niche content by providing a means for customer directed advertising, through data collection and analysis, for the purposes of demographic modeling.

BRIEF SUMMARY OF THE INVENTION

Using a novel cyclic interleaving scheme the present invention can consolidate many individual, independent channels of data, of varying content, quality, and size, into a single Transport Stream of data which can then be sent to Receiving Units via any number of transfer modes such as, Internet, Wi-Fi, WiMax, cellular networks, 3G, and broadcast paths such as digital TV, HDTV, ATSC, HVB-T, HVB-S, DMB-T and others.

Many data sources are collected and located at one or more Network Operating Centers (NOC). These data sources are edited and processed, resulting in independent Channels of data. Such editing and processing may include, but is not limited to, converting quality, editing length, scheduling order, combining data sources, marking insert points, removing unwanted content or advertising, insertion of advertising data, identification tagging, and the like. Some of the editing and processing will vary depending upon information previously gathered and analyzed from census data and status and use data obtained from receivers.

The Channel Data is transferred to a plurality of Transmission Servers as an IP tagged data stream. This transfer is accomplished, for example, over the Internet, by satellite, or by any other means or combination of means capable of reaching any or all of the Transmission Servers. Additional information can also be sent to the Transmission Servers for example, software updates, system updates, scheduling information, frequency maps, advertising data, advertising schedules or rules, as well as information to be passed along to individual or select groups of receivers. This information can be sent as a part of the Channel Data, separate from the Channel Data, or both.

The Transmission Servers process the Channel Data and additional information that was transferred from the NOC and then transmit the data as an outgoing signal over a frequency or group of frequencies. Processing done by the Transmission Servers can include, but is not limited to: parsing out Channel data which it will not transmit; inserting advertising data particular to that individual Transmission Server; inserting advertising data particular to individual or groups of Receiving Units geographically associated with that individual Transmission Server; software updates, updating frequency tables based upon geographical location; creating coupons; analyzing and creating social information; creating, editing and inserting time activated specific advertising, audio messages, digital traffic information, signage data and the like.

After processing the Channel Data, multiple Channels of data are sent to a cyclic processor. Arranged as a circular buffer, with pointers, data size of channel and packet ID inserted by the processor, a single cycle of the processor produces a Data Package comprised of packet identification information, packet structure information, and data packets comprising channel identification information and channel data for each of the input Channels. The processor then presents the resulting Data Package at an output where it is appended to a Transfer Stream for transfer by transmission to Receiving Units. The processor can repeatedly cycle producing additional Data Packages and sequentially appending these Data Packages to the Transfer Stream as they are produced. The process can cycle continuously until all Channel data has been processed and subsequently transmitted.

A Data Package can also comprise service data which can be included for example, on an as needed basis, on a schedule, on a periodic basis, or any combination thereof. Service data can be used to transfer, for example, software updates, schedules, frequency maps, advertisement info and the like.

A Receiving Unit will receive and identify the Transfer Stream transmitted by the Transmission Server. The Receiving Unit can locate and tune into the transmit frequency by, for example, using the last frequency it operated at, using a frequency identified in a stored frequency map based upon its location as determined by Global Positioning, or scanning previously identified frequencies.

Upon a request from the user of the Receiving Unit; on a stored schedule; if externally signaled, for example under emergency conditions; when within a designated location based upon the Receiving Unit's location as determined by Global Positioning; or other events, the Receiving Unit will process the Transfer Stream and output the requested Channel data. This is done by reversing the cyclic processing performed at the Transmission Server, by selecting packets from a Data Package corresponding to the requested Channel and reassembling these packets into the whole, original Channel Data. This may be done in real-time as the Transfer Stream is received, via a buffer, or from a Transfer Stream previously received and stored locally at the Receiving Unit. This process enables fast channel switching in the receiver, as all of the Channels are present and just need to be reassembled; there is not need to change the tuning or receiving frequency.

A Receiving Unit can send status information to the NOC which is processed by the NOC and can be used to evaluate changes in advertising or functionality at a Receiving Unit or Transmission Server, to update frequency maps, to personalize data and Channels sent to the Receiving Unit, or the like.

DETAILED DESCRIPTION OF THE INVENTION

Figure 1:
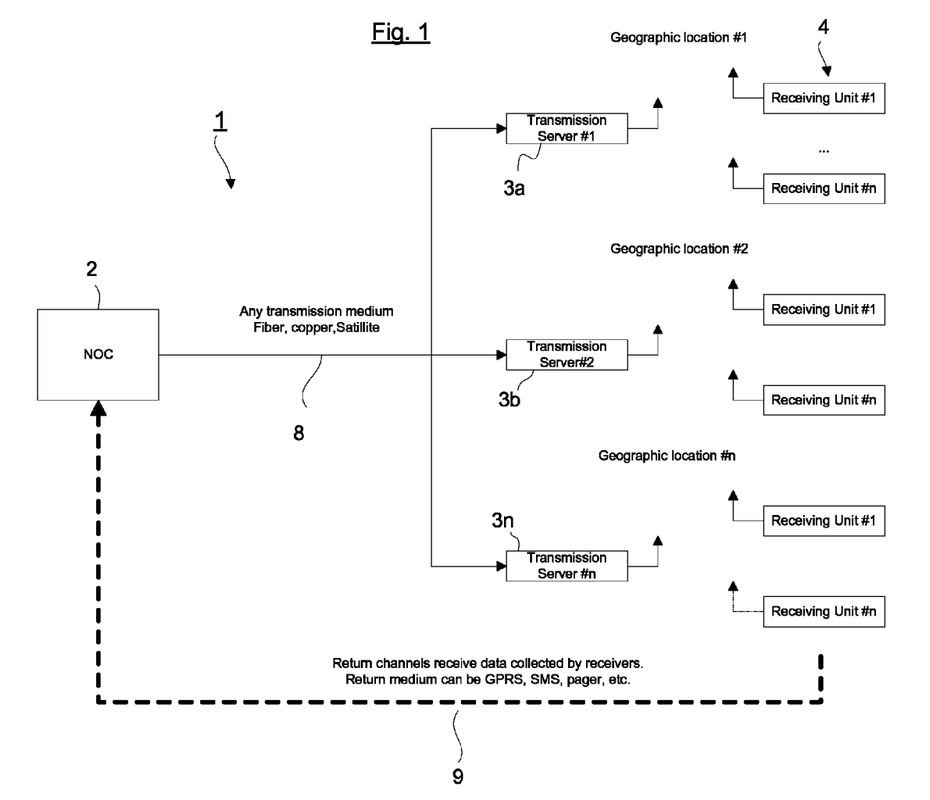
FIG. 1 is a schematic representation of a system for providing multiple channels of data located at a centralized location to a plurality of receivers and for providing status of the receiver back to the centralized location.
Figure 2:
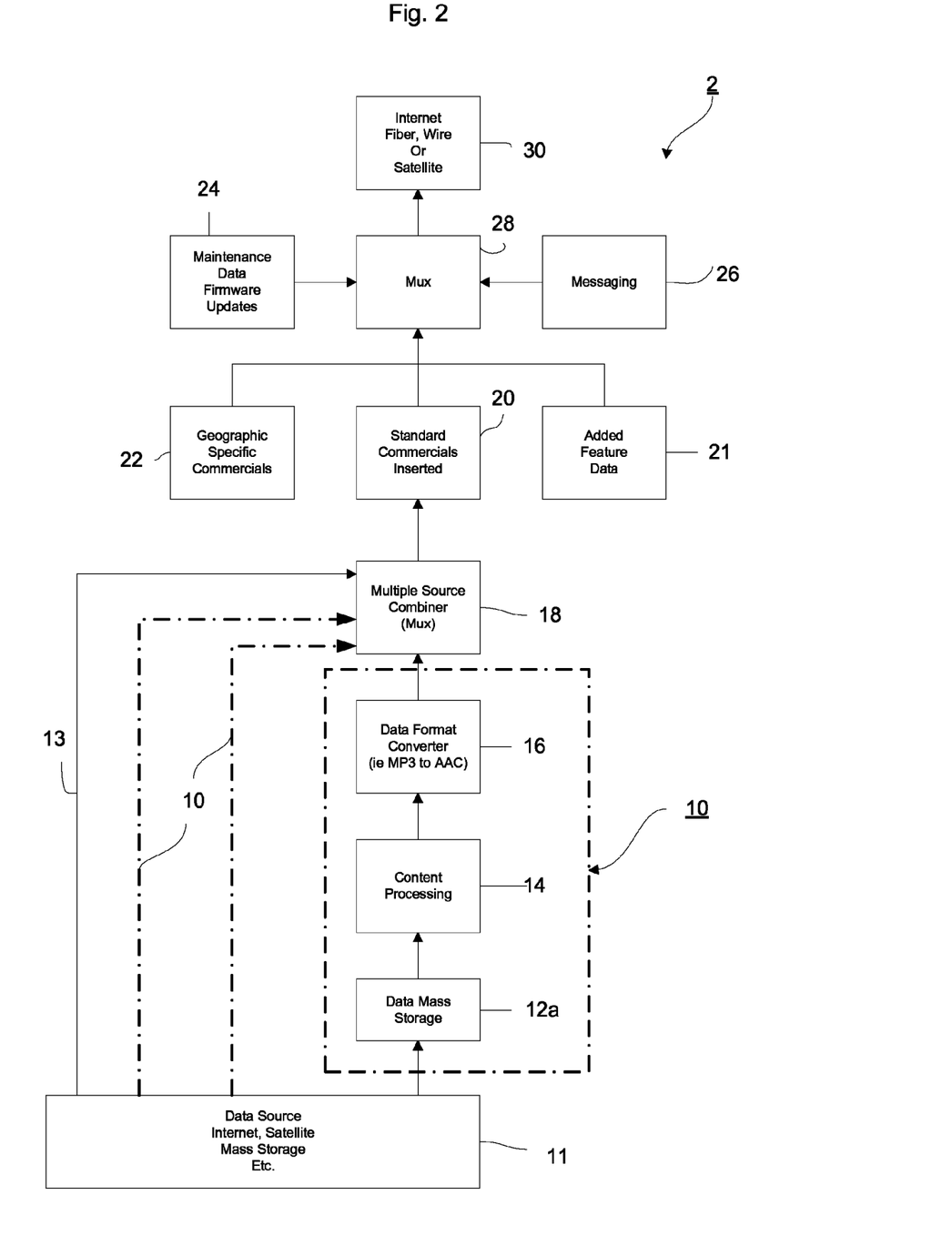
FIG. 2 is a schematic representation of a NOC

Referring to FIGS. 1 & 2: The NOC 2 is a centralized location for collecting and processing data to be sent to one or more Receiving Units 4 receivers. More than one NOC can be used, preferably to provide redundancy of function and data; as such, the NOCs will communicate with each other to ensure duplication at each NOC. Communication can be through, for example, Internet, high speed land connections, or other suitable connection means. The sources of data 11 are not critical to the functioning of the NOC. Usable data sources include, but are not limited to, satellite feeds, received broadcast, MPLS, tape, CD, or DVD, Internet, FTP, operator input, and text files. Content can be comprised of national, local and syndicated programming. Processing the NOC may perform includes, but is not limited to, gathering, storing, assembling, editing, evaluating, categorizing, filing and scheduling.

Data is placed in archival storage 12 for processing; such processing comprising, cataloging, tagging, time sequencing, editing, and scheduling. Data can also be collected and processed without archiving 12a, for example, if needed for emergency situations, alerts, critical system updates, or the like. As necessary, the NOC can operate with data from archival files, collected or produced in real-time, or a combination thereof. Archiving is preferred when collecting data sources which are broadcast in different time zones and will be archived and sent to the Receiving Units at a time more convenient for U.S. time zones.

In a preferred embodiment, data is processed in the form of a data Channel 10; each Channel comprising one or more data sources which will be combined and then be associated and processed with that Channel. Processing of Channel data processing can comprise: assembling various data sources into a single data Channel; arranging data for scheduling preferences or requirements; editing for content; adjusting duration; formatting; compression formatting 16; inserting, deleting, or replacing advertisement data; inserting, deleting, or replacing markers for later processing; removing unnecessary, inappropriate, damaged, or unusable data; repairing damaged data; converting stereo to mono audio data; converting high quality to lower quality data; and combinations thereof. The order and extent of Channel data processing is not fixed and can be varied and different for each Channel and each data source.

After content processing each data Channel 10 is assigned an identifier which is added to the Channel data and is then combined with other data Channels 18 into a single data stream for further processing and transfer. The single data stream can be processed by inserting additional data such as standard or generic commercial content 20, geographic specific advertisement content 22, and other content 21. This additional data is inserted at markers placed in the individual data Channels in the Channel data processing 14. The data stream is then combined 28 with support data 24, and messaging data 26 and is transferred 30 to one or more Transmission Servers. This transfer can be achieved by any acceptable means or combination of means for each Transmission Server. Examples of usable transfer means include, but are not limited to, Internet, satellite transmission; MPLS, FTP, or the like, or combinations thereof. Support data 24 may be comprised of Channel transmission schedules; Channel guide information, such as, names of Channels, schedule of upcoming programs for Channels, names of programs, artists, duration; additions, changes, and updates to Transmission Server authorizations, which can be permissions for all or specific Transmission Server's, for example, which Channels can be transmitted, which Channels can be altered/edited, and which advertisements can be inserted; frequency maps: system updates; software updates; advertising content data; directions, rules, schedules, geographical limits and permissions for advertisement usage; marketing data; Receiving Unit specific data; directions and content for advertisements for specific Receiving Units; and combinations thereof. Messaging data 26 may comprise textual data to be sent to, stored, and utilized by Receiving Units; for example, emergency notifications and general information for the users of the Receiving Units. Support and messaging data can be sent to the Transmission Server's along with the Channel data, on a schedule, periodically, on an as needed basis, and any combination thereof.

In one preferred embodiment, each Channel is assembled into an IP data stream 18 and transferred over the Internet 30. In the IP data stream each data Channels is tagged with an IP address; the IP address can be used at a Transmission Server to identify the corresponding Channel data.

Figure 3:
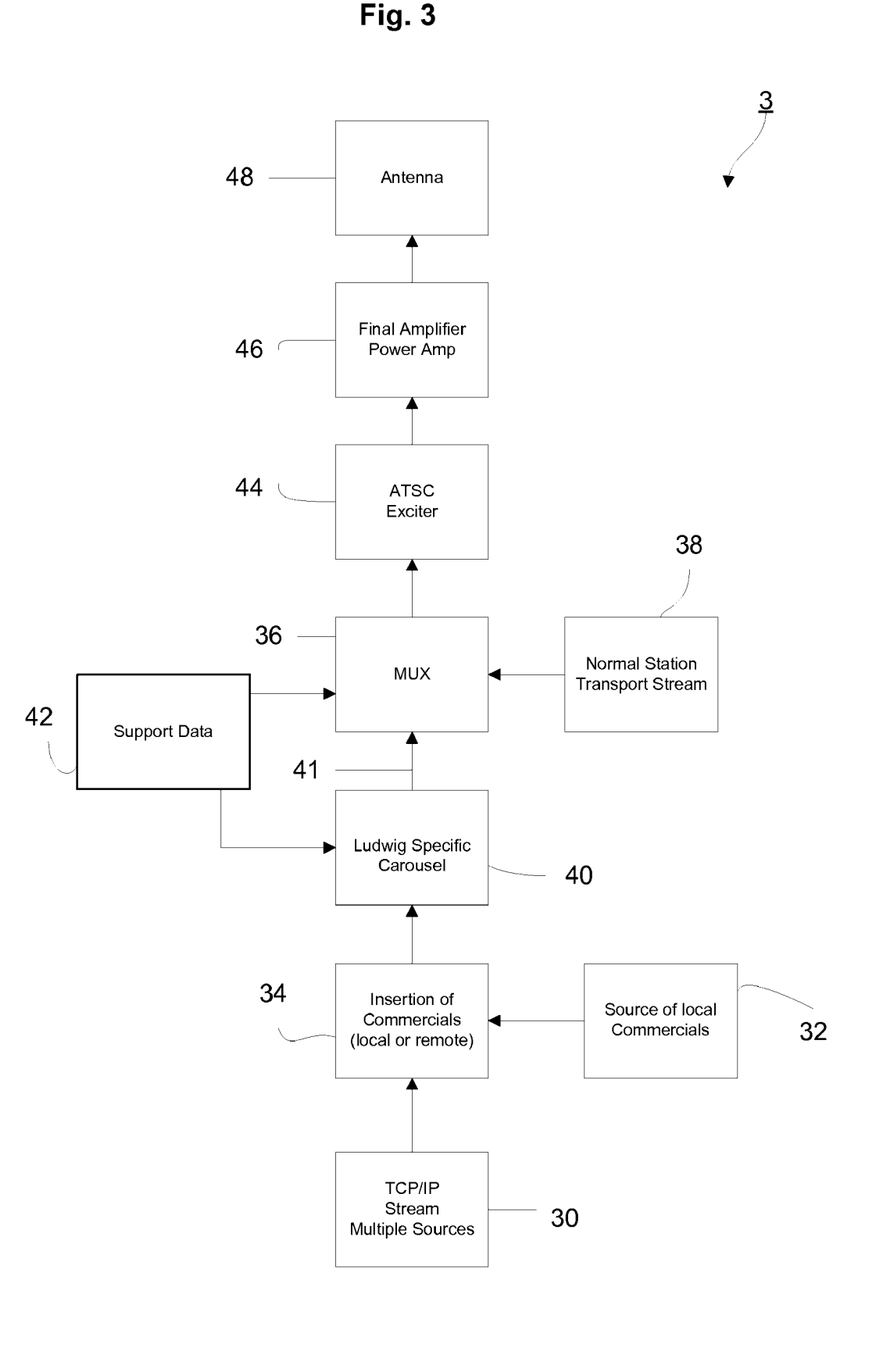
FIG. 3 is a schematic representation of a Transmission Server

Referring to FIG. 3; in a preferred embodiment all processed Channel data is sent to all Transmission Servers 3 (and FIG. 1, 3*a*-3*n*). There is no limit to the number of Transmission Servers that can be in the system. The location and number of Transmission Servers is in part determined by market demand, customer demographics, transmitter availability, and geographic location. For example, in a dense population area there may be more than one Transmission Server to ensure full geographic coverage and prevent loss of signal while traveling throughout the geographic area. Another advantage of using more than one Transmission Server in a geographical location is the ability to take advantage of a particular Transmission Server's permanent or temporary transmission status. For example, at a given time or on a given schedule, a particular Transmission Server will have bandwidth available when another Transmission Server has no available bandwidth all full or when the cost of using a particular Transmission Server is lower than other Transmission Servers in the area. In the present system a Receiving Unit (FIG. 1, 4) can determine which Transmission Server is a preferred or available, Transmission Server in an area. This can be achieved through the use of frequency maps constructed by the NOC.

Since different Transmission Servers will transmit on different frequencies, especially in crowded areas, a preferred embodiment uses frequency maps to aid in proper transmitter-receiver communication. A frequency map is maintained and updated at the NOC and sent to the Transmission Server for use and transmission to the Receiving Units. In one preferred embodiment the transmission frequency in a given geographical region can be changed frequently. This may be achieved by the use of multiple Transmission Servers in the geographical region. The Receiving Unit can use a stored frequency map to match it's given GPS location with the available, corresponding Transmission Server in the geographic region. In addition, certain transmitters can use more than one frequency; being frequency agile these transmitters can use available bandwidth on different frequencies as it becomes available. Using a number of such frequency agile transmitters would greatly increase the geographical coverage of transmissions and increase the transmission and monetary efficiency of the system.

In some cases bandwidth on any one Transmission Server may be available on a limited time basis requiring the Receiving Unit to change which Transmission Servers and frequencies it uses on a relatively frequent basis. While a frequency map can still be used in such a frequency changing scenario, the Receiving Unit can also scan frequencies to find the appropriate system signal.

Each Transmission Server receives the data from the NOC and processes Channel data, support data, and messaging data and prepares the data for transmission to the Receiving Units.

In one embodiment, each Transmission Server is updated with a channel set. A channel set is comprised of a list of Channels that an individual Transmission Server is allowed to transmit. The contents of a channel list for a Transmission Server can be determined by factors including: demand for a Channel in the Transmission Server's service area, licensing limitations and permissions, advertisement revenue for a specific Channel or for the service area of a Transmission Server, calculated audience, prospective audience, and the like. In one embodiment the list comprises the IP address of each allowed Channel sent to the Transmission Server in the IP data stream from the NOC.

The Transmission Server will extract any authorized Channels from the IP data stream, ignoring unauthorized Channels and process the extracted data Channels for e.g., content, advertisement, and scheduling in accordance with any directions, rules or permissions received from the NOC.

Referring to FIGS. 3-6, before transmission, the Channel data is assembled 40 into a data Transfer Stream 41 which can be recognized, identified, and subsequently disassembled into the separate, individual data Channels by the Receiving Units. The resulting Transfer Stream is then sent to a multiplexer 36 where it is prepared for transmission over the Transmission Server transmitter at the Transmission Server's designated frequency 44, 46, 48.

Figure 4:
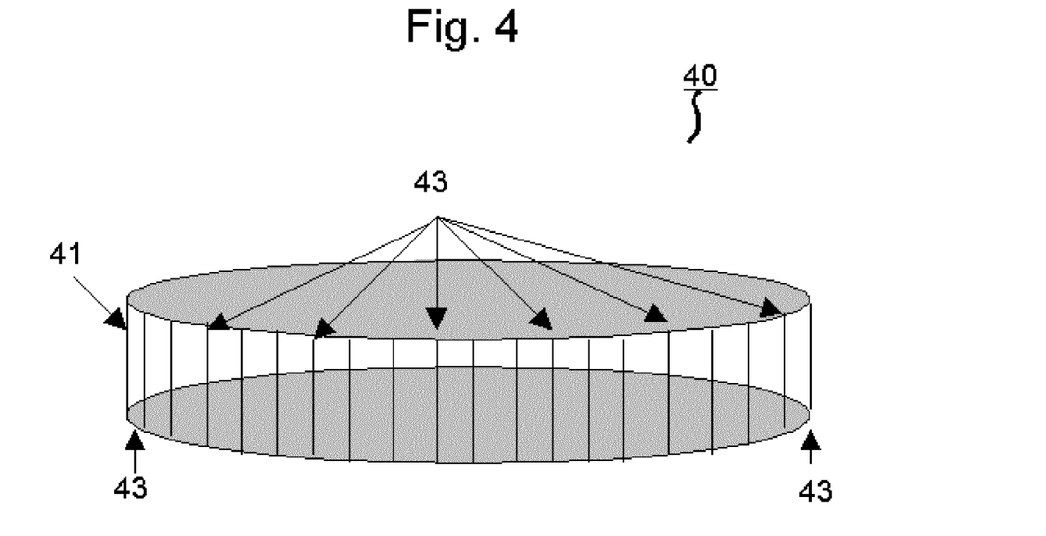
FIG. 4 is a schematic representation of a Cyclic Processor

In a preferred embodiment the Channel data is assembled into a single data Transfer Stream 41 by processing the Channel data through a novel cyclic processor of the present invention, also referred to as a Ludwig Specific Carousel 40 (LSC). Each Transmission Server has it's own LSC. The data for allowed Channels (FIG. 5*a*) are placed at the input of the LSC for processing.

Figure 5A:
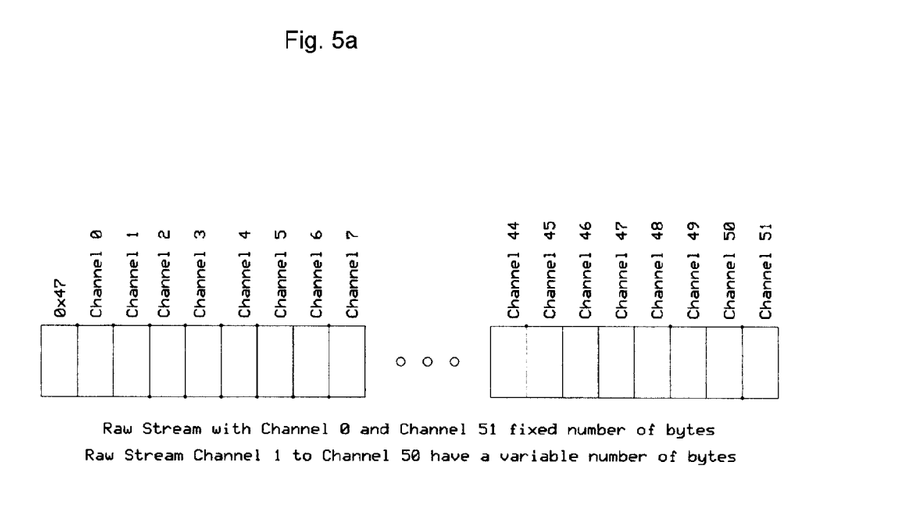
FIG. 5a is a schematic representation of data input to an cyclic processor
Figure 5B:
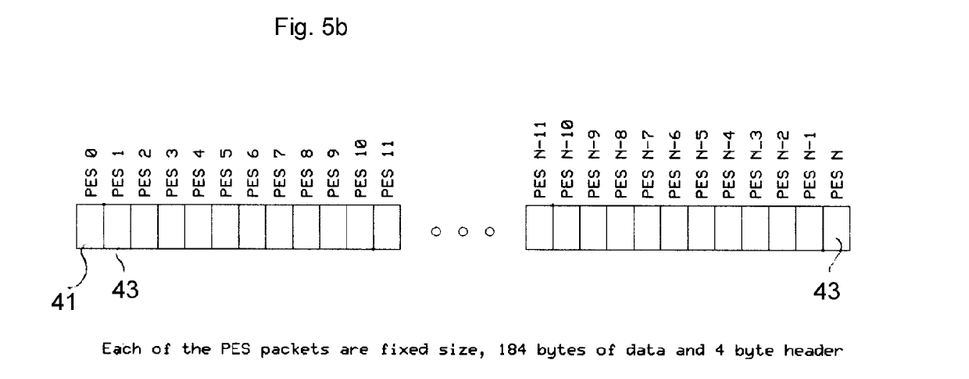
FIG. 5b is a schematic representation of a Data Package
Figure 6:
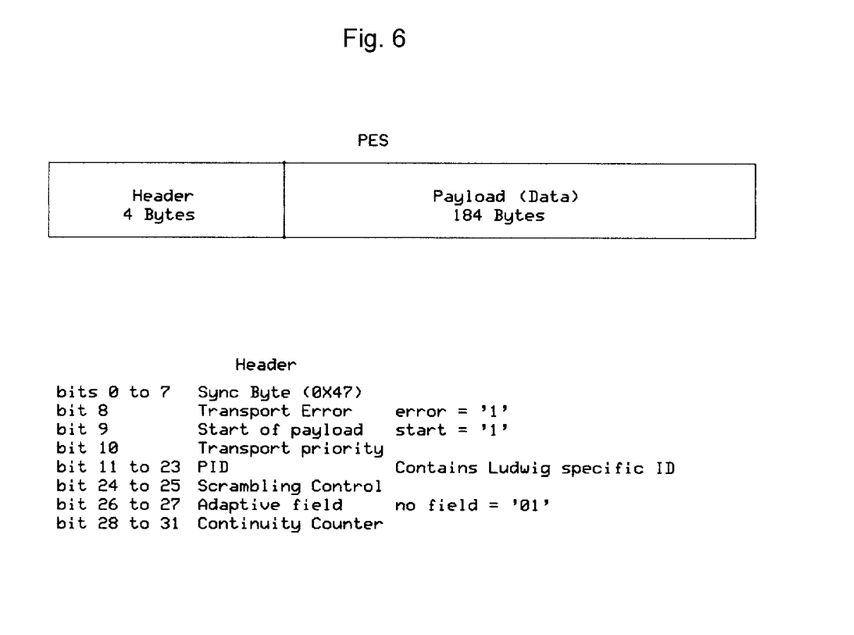
FIG. 6 is a schematic representation of a single Data Packet

A single cycle of an LSC takes a portion of data from each Channel (a Data Packet) and produces a single Carousel Data Package comprised of a header (or sync) packet followed by one or more Data Packets (FIG. 5*b*). This Carousel Data Package is then appended to a Transfer Stream at the output of the LSC. The LSC repeatedly cycles, progressively taking more data from each of the Channels, produces a Carousel Data Package, and continuously appending to the Transfer Stream. A Data Packet within the Carousel Data Package may comprise support data. The number and size of Channel packets is not limited. Conditions and equipment at an individual Transmission Server, type of Channel data, quality of Channel data, as well as transmission standards, such as ATSC, FM, AM, GPRS, 3G, Satellite, influence the parameters of the data within the LSC.

Information in the Carousel Data Package header packet may be comprised of:
  a) information which identifies the Carousel Data Package as data produced by the LSC;
  b) time data;
  c) synchronization data;
  d) type of compression used;
  e) type of data in each data Channel;
  f) Data Packet information for each Data Packet within the Carousel Data Package comprising a Packet pointer for identifying the starting point of the Data Packet within the Carousel Data Package and the size of the Data Packet, wherein the Packet pointer may be comprised of a hexadecimal offset;

In the case where a Data Packet in the Carousel Data Package comprises support data the Packet pointer and size correspond to the support data packet.

In a preferred embodiment the Channel data is assembled into an American Systems Television Committee (ATSC) compliant data stream. The requirements for an ATSC compliant data stream are set out in various ATSC standard publications. Of particular relevance are ATSC specifications A74, A90, A95 and A97, see, e.g., http://www.atsc.org/ (hereby incorporated in full by reference). The present invention can be used and modified to remain compliant with changes or modifications to any of these applicable ATSC standards. The resulting ATSC Data Stream is then sent to a multiplexer where it is prepared for transmission over the Transmission Server transmitter at the Transmission Server designated frequency.

In one preferred embodiment, an ATSC compliant Carousel Package is comprised of up to 52 packets comprising 188 bytes of data per packet. The first 188 byte packet comprises the Carousel Package header information. Subsequent packets are comprised of 4 bytes of data information comprising packet identification information (PID) and 184 bytes of Packet content data, FIG. 6. The 4 byte PID may comprise Channel identification information or information identifying the packet as containing support information, updates, advertising, or the like.

In this embodiment the number of channels, 52, and size of packets, 188 bytes are used to be compliant with current ATSC specifications. The number and size of packets within a Carousel Data Package can be changed to be compliant with new, or changes to, ATSC specifications or other transmission specifications which may be used or developed. Support data can be transmitted within the ATSC Transfer Stream having been processed through the LSC, in ancillary data packets which are separate from the main data stream as set out in ATSC standards, or a combination thereof.

The final terminus of the present data transmission system is a plurality of Receiving Units. Each Receiving Unit is comprised of: a receiver; an operating system; data storage; a screen; one or more input mechanisms; and one or more external interfaces. Preferred Receiving Units have GPS capability and one or more transmission means.

A preferred Receiving Unit comprises an ATSC compliant receiver having the ability to receive ATSC data packets such as those defined within ATSC specifications A74, A90, A95 and A97. Such a Receiving Unit depacketizes the received and stored data, then sorts and decodes the data, reassembles the separate Channel data and support data, and outputs or stores the Channel data and support data into memory.

While the Receiving Unit can function in real-time, outputting a data Channel as it is received and processed, a preferred Receiving Unit will store the data in memory for later presentation to the user. The transmission and receipt of the Transfer Stream can occur at speeds much greater than real-time playback of the Channel data would require. The ability to send large amounts of data increases the efficiency of the system: only requiring short transmission times; the ability to make changes, updates, and notifications quickly; and conserves bandwidth.

In use, the user of a Receiving Unit selects a Channel to access using an input mechanism, external input, or external interface. The Receiving Unit removes the ATSC data packets from memory, depacketizes data, and reassembles the separate Channel data of the selected Channel. The selected Channel data may be processed as necessary to conform to listening or access requirements. An example of such processing includes processing the Channel data through a CODEC to produce and audio stream; common audio CODECs include, but not limited to, MP3, AAC, m4a, WAV, Vorbis, MPEG, and the like. Visual image CODECs include, but not limited to, BMP, JPEG, GIF, PNG and the like. An audio stream can be output to a speaker in the Receiving Unit, to a headphone jack, or to an interface for external use. An image or text can be displayed on the screen or output to an interface for external use or display.

Audio, visual, or text information can also be processed and output to the user when triggered by an external stimulus such as time of day, temperature, GPS location, or marker in Channel or support data.

Each Receiving Unit has a unique identifier such as an IP address, MAC address, serial number, or an ID number assigned when it is distributed to a user. This identifier can be used to send data, instructions, updates, advertisements, and the like to any single or group of Receiving Units specifically. The identifier can also be used to identify any data that is sent from an Receiving Unit to the NOC or to another Receiving Unit.

A preferred Receiving Unit collects status information and sends this data to the NOC. This data can be collected and stored at scheduled intervals, at scheduled times, upon receipt of a request or instructions, upon the occurrence of an event or condition, on startup, before shutdown, or any combination thereof. Collected data may comprise: Receiving Unit identifier; time and date; GPS information; Channel data use; duration of use; external sensor information such as temperature, humidity, or barometric pressure; and combinations thereof. Upon the occurrence of an event, scheduled time, or a transmitted request from the NOC, the stored data is sent to the NOC using any of one or more transmission schemes. Such schemes include, but are not limited to, cellular network, GPRS, SMS, pager, 3G, Wi-Fi, and Wi-MAX, for example.

In another embodiment the GPS information for the Receiving Unit can be used to activate the visual display or audio playing of data stored on the Receiving Unit. Such data may comprise advertisements, advertisements relevant to the GPS location, and emergency notifications directed towards a specific geographical location.

The NOC collects, compiles and analyzes the status information received from the receivers. In addition user information and listening habits can be cross-matched and compared to available census data for a given region such as: customer ethnicity, location, economic status, etc.

In another embodiment the GPS location information can also be used in Receiving Unit to Receiving Unit communication. Receiving Units can communicate using cellular network, GPRS, SMS, pager, 3G, Wi-Fi, and Wi-MAX, for example. Receiving Units can be programmed to send out status information; information input by the user; and ATSC Data Stream data previously stored. In one example, a Receiving Unit will broadcast its GPS location and unit identifier. Other Receiving Units can receive this information and, if programmed or requested by the user, trigger an action such as displaying the proximity of the broadcasting Receiving Unit. Once notified of their mutual proximity, the users of these Receiving Units can then communicate between the Receiving Units using text and images stored on the Receiving Units or input by the users via an input mechanism or external interface. The ability to receive and send data will allow a Receiving Unit which is out of range of a Transmission Server to receive and send the data from a Receiving Unit which is in range or closer range of a Transmission Server, enabling the Transmission Server and the out-of-range Receiving Unit to communicate via single hop or multiple hops from Receiving Unit to Receiving Unit.

While this description has set forth a number of examples of the current invention, these examples are not presented or to be interpreted as limiting the system or method of the current invention.

The invention claimed is:
1. A system for transferring a plurality of data sources using a single data transfer stream comprising:
a network operating center (NOC) including a centralized storage for said plurality of data sources; and an editing processor for editing said plurality of data sources;

a communication link for transferring said edited plurality of data sources;

a plurality of transmission servers communicated to the communication link;

a packetizing and combining processor at each of said one or more transmission servers for cyclically packetizing and combining said plurality of data sources into a single data transfer stream; and, a plurality of receivers for receiving and processing said single data transfer stream communicated to the packetizing and combining processor in each one of the plurality of transmission servers, the plurality of receivers reversing the cyclic packetizing and combining performed in a corresponding one of the transmission servers, by select packets from a data package corresponding to a requested channel and reassembling these packets into the whole, original channel data enables fast channel switching in the corresponding receiver without any need to change a tuning or receiving frequency.

2. The system of claim 1 where the network operating center (NOC) is bidirectionally communicated with each of said plurality of receivers for transferring status information to said centralized storage of the network operating center (NOC) from one or more of said plurality of receivers, the receivers being intercommunicated with each other so that the status information is communicated from any receiver not finding an open path of communication to the network operating center (NOC) through another receiver having an open path of communication to the network operating center (NOC).

* * * * *